United States Patent Office 3,465,540
Patented Sept. 9, 1969

3,465,540
AUTOMATIC ICE CREAM MACHINE
Poerio Carpigiani, Bologna, Italy, assignor to APAW S.A., Fribourg, Switzerland, a joint-stock corporation of Switzerland
Filed Jan. 2, 1968, Ser. No. 695,154
Claims priority, application Italy, Jan. 2, 1967, 6,703/67
Int. Cl. F25c 7/06; F25d 19/00
U.S. Cl. 62—343          7 Claims

ABSTRACT OF THE DISCLOSURE

A household ice cream machine having mounted the freezing apparatus and the freezing can-operating means in a cabinet, by which the freezing can has mounted therein a rotatable agitator or dasher driven from outside the can through a hole of the can bottom. This hole, when the dasher is removed, serves as wash water or liquor outlet hole and opens in the channel or spout through which the wash water is discharged.

---

The present invention relates to the automatic ice cream machines, and more particularly to an automatic household ice cream machine for the processing of relatively small batches of ice cream, as requested for instance in small communities, hotels, large families, or the like.

According to one feature of the present invention, an ice cream machine of the kind above referred to comprises substantially a fixed ice cream freezing can, cooling means surrounding said can, and a rotatable agitator or dasher housed inside and driven from below said can and which dasher may be extracted therefrom, along with the formed ice cream batch, by simply seizing a grip provided at the top end of the dasher axle, and by lifting by means of a simple pull said dasher and ice cream.

According to a still further feature of the present invention, the freezing can of the ice cream machine according to the invention is provided with an axial through bore in its bottom, through which the lower end of the dasher stem may extend, means being provided in axial alignment with the said bore for temporarily coupling the dasher end to the dasher-actuating means.

According to another feature of the present invention, the said dasher is provided with an integral disk-like member which, in operation of the machine, abuts on the bottom of the freezing can.

According to a further feature of the present invention, means are provided associated with the freezing can for permitting an easy and thorough washing of the freezing can.

Further objects and advantages of the ice cream machine according to the invention will become apparent from the following specification, made with reference to the accompanying drawings, in which:

FIGURE 4 is a perspective view of a fitting to be mounted in the freezing can of the machine according to the invention, instead of the dasher, when the machine should be used for the production of ice tiles.

Figure 1:
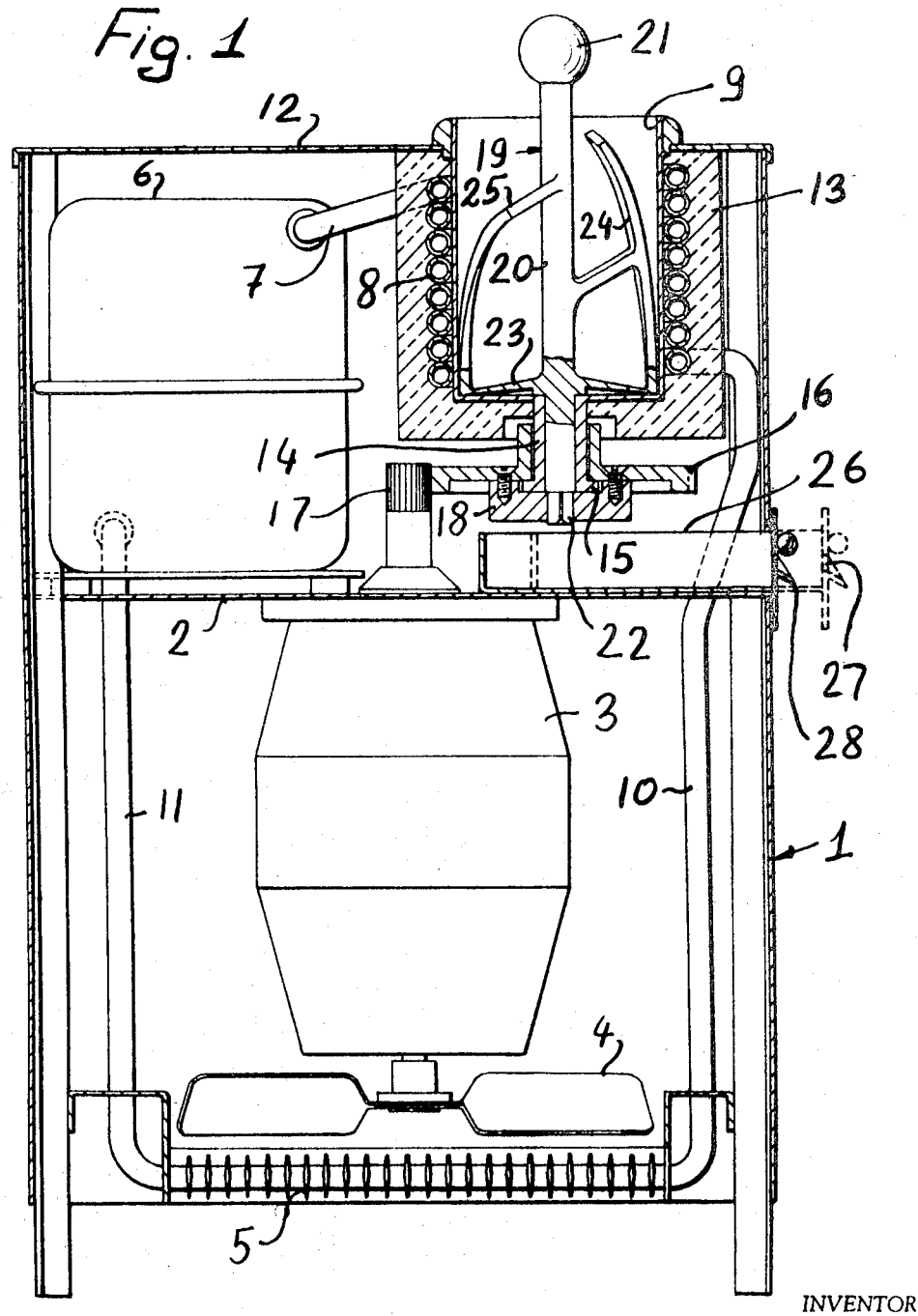
FIGURE 1 is a partially sectioned side view of the ice cream machine according to the invention.

With reference to FIGURE 1, 1 denotes generally the cabinet of the ice cream machine, fitted upon a suitable frame and which comprises front, rear and side walls, as well as a sheet metal cover 12. In the form as shown herein, the cover 12 is provided with a suitable opening, through which the upper end of the freezing can 9 projects. Within the cabinet 1 a horizontal supporting plate 2 is fastened at a suitable height to the cabinet frame.

Within the cabinet 1 the refrigerating apparatus is mounted, which comprises, as usual, the compressor 6, supported on plate 2, the condenser 5 mounted near the bottom of the cabinet 1 and connected at one end to the compressor 6 by means of pipe 11, and the expansion coil 8 surrounding the freezing can and connected at one end to the condenser 5 by means of pipe 10, and at its opposite end to the compressor 6 by means of pipe 7.

The part of the freezing can 9 mounted below cover plate 12 and the surrounding expansion coil 8 are covered with a suitable insulating jacket 13.

The freezing can 9 is cylindrical and is provided at its bottom with an axial through bore. A cylindrical hub 14 provided with a cylindrical bore, is secured to, and extends downwardly from the lower side of the bottom of the freezing can, in axial alignment with the bore of the can bottom. Said hub is provided at its lower end with a radially outwardly projecting flange 15, for the purposes which will be seen hereinafter.

On the hub 14 a gear wheel 16 is idly supported, bearing against the upper side of flange 15. A counter plate 18, provided centrally with a square (or otherwise non cylindrical) bore, is secured by means of screws to the underside of the gear wheel 16, with its non cylindrical bore in axial alignment with the cylindrical bore of the hub 14.

From the lower side of plate 2 the actuating electric motor 3 is suspended. The upper end of the driving shaft of motor 3 projects upwardly through a bore in plate 2, and on said shaft end a pinion 17 is keyed, meshing with the gear wheel 16.

A fan 4 is secured to the lower end of the shaft of motor 2, above the condenser 5 of the refrigerating mechanism, so as to provide for a quick dissipation of the heat from condenser 5 during operation of the machine.

Figure 2:
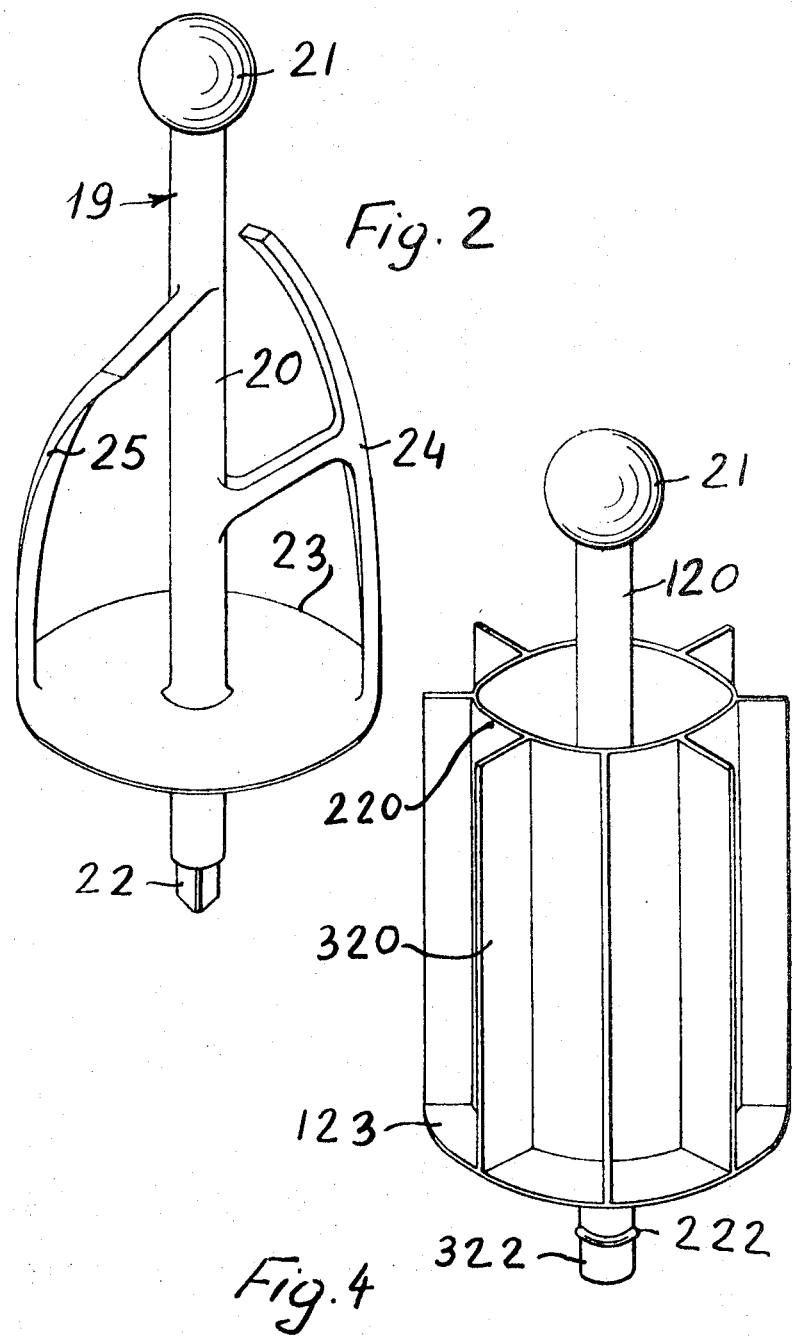
FIGURE 2 is a perspective view of a dasher of the ice cream machine shown in FIGURE 1.

Inside the freezing can 9 of the just described machine a dasher, generally indicated by the reference numeral 19, is housed. In the embodiment shown in FIGURE 2, said dasher comprises a stem 20 ending at its top end with a handgrip 21, and at the opposite end with a non-cylindrical extension 22, having the same cross-sectional shape as the bore of plate 18 (in the case as shown, both are square in cross section) and adapted to function as coupling member, as will be better seen hereinafter. In an intermediate position on said stem a disk like plate 23 is secured, having an external diameter just a little smaller than the internal diameter of the freezing can 9. From the periphery of said plate 23 the dasher blades 24, 25 depart, which extend upwardly substantially for the whole height of the freezing can 9.

In operation of the machine, the dasher 19 is inserted into the freezing can 9, with the lower extension 22 of the stem or shaft 20 extending through the axial bore of the hub 14, until the plate 23 bears on the bottom of the freezing can 9, and the square lower extension 22 of stem 20 fits into the correspondingly shaped bore of plate 18.

Thereafter, the liquid ice cream mix is poured into the can 9, the motor 3 is started and the refrigerating unit 6 is put into operation.

Motor 3 drives through pinion 17 and gear wheel 16 the counter-plate 18 and the dasher 19 coupled thereto through shaft extension 22. Once that the ice cream mix inside freezing can 9 has been transformed into ice cream, by the combined action of the cold supplied through the evaporator coil 8 of the refrigerating unit and the mechanical agitation of the dasher 19, motor 3 and compressor 6 are stopped. The ice cream batch thus formed may be easily extracted from freezing can 9 by seizing handgrip 21 and pulling outwardly the dasher 19 along with the ice cream supported by plate 23.

When the ice cream has been detached from the dasher 19, this latter may be easily washed under a water tap. The freezing can 9 without dasher, in its turn, may be easily cleaned also by means of flowing tap water. To this end, beneath the freezing can 9 a drawer-like outlet channel 26, provided with a front opening 27 and spout 28, is slidably mounted on plane 2. By partially extracting the said drawer 26 (dash-line position of FIGURE 1) the wash water may flow down the spout 28 into a suitable collecting vessel, placed thereunder. Thus the can 9 may be washed with tap water and detergents, and the water from can 9 will flow through the axial bore of hub 14, down into and out of the drawer 26 through port 27.

Once washed can 9, the dasher may be again inserted in place inside can 9, as described above.

Figure 3:
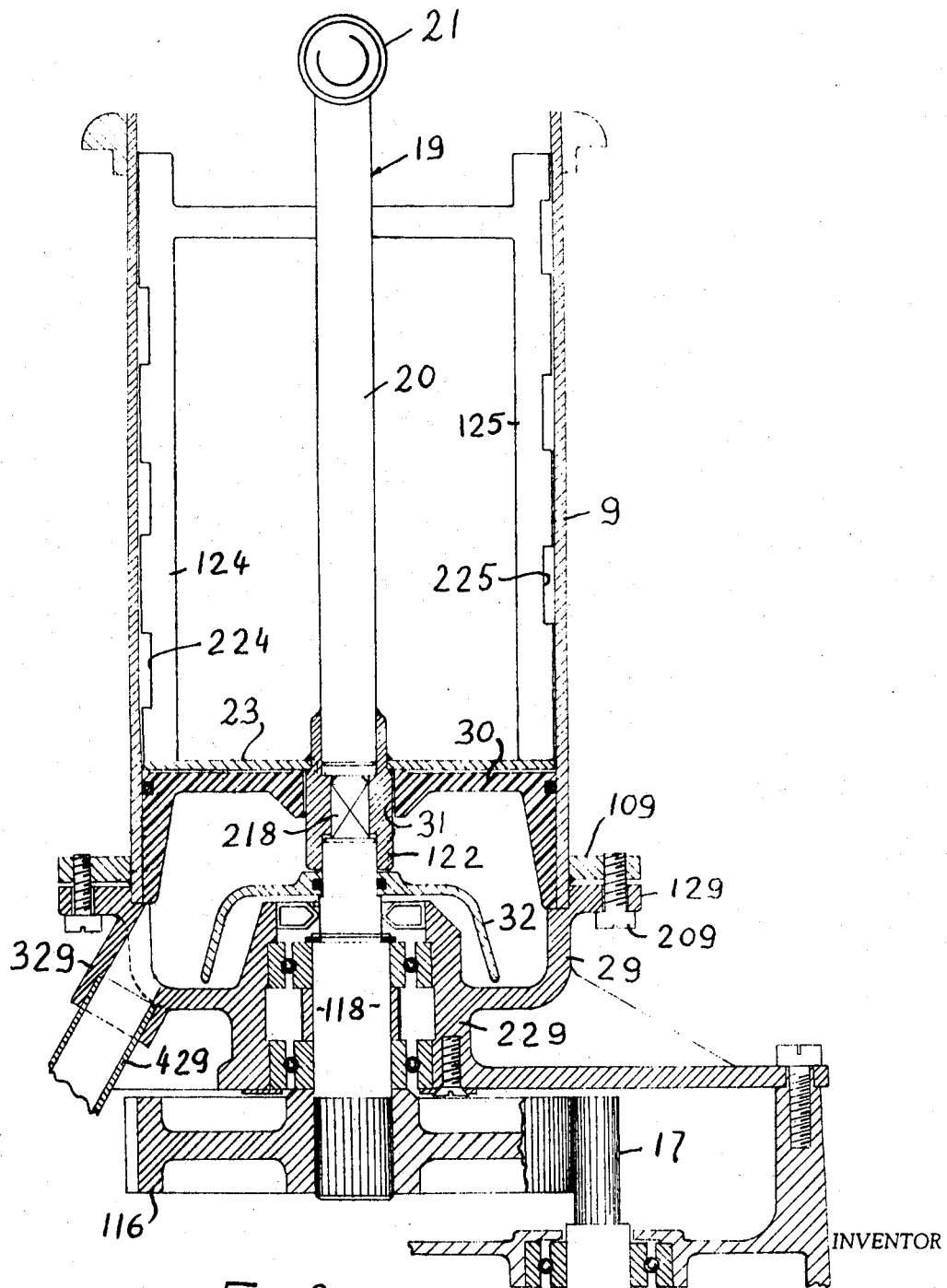
FIGURE 3 is a vertical section of another embodiment of the freezing can and of the dasher-actuating device according to the invention.

In the embodiment of the invention as shown in FIGURE 3, the freezing can 9 is in the form of a cylinder open at both ends. To the exterior of the lower end of cylinder 9 an annular flange 109 is secured, which may be connected by means of screws 209 to a corresponding annular flange 129 integral with the edge of a cup shaped base member 29, provided with an axial hub 229 inside of which a vertical shaft 118 is rotatably mounted. The lower end of shaft 18 extends outside of hub 229 and carries a gear wheel 116 in mesh with a pinion 17 keyed on motor shaft.

The upper end of shaft 118 extends a certain distance above the cup 29 up to the lower section of the freezing can 9, and ends with a square end 218 inserted in a correspondingly shaped bore of a cylindrical bushing 122 welded to the bottom plate 23 of the dasher 19. The cup 29 has a lateral discharge spout 329, to which a drain pipe 429 may be connected.

The lower end of the freezing can 9 is closed by a bottom cover 30, provided with an axial through bore 31 through which the cylindrical bushing 122 integral with the dasher 19 is loosely mounted.

A reversed-cup-shaped skirt 32 is secured to shaft 118 just above hub 229.

The operation of the described embodiment is apparent. By rotatably driving pinion 17, through gear wheel 116, shaft 118 and coupling 218–122 the dasher 19 will be revolved.

Whenever it is required to wash the freezing can 9, the dasher 19 is extracted, and thus the wash water introduced into the can 9 flows through bore 31 of the bottom cover 30 into the bottom of the cup-shaped member 29, and out through port 329 and pipe 429.

It is also possible to inspect the lower chamber defined by the cup-shaped bottom member 29 and the bottom cover 30 by simply lifting said cover 30 outside of the freezing can 9.

As shown, in the present embodiment of the invention the dasher blades 124, 125 are in the form of straight scraping blades, and are provided with offset notches 224, 225, so as to provide for a complete scraping of the can interior for each 360° revolution of the dasher unit.

In FIGURE 4 an attachment is shown which may be used instead of the dasher unit 19 for the production of ice tiles.

As shown, the said attachment comprises a stem 120, provided at its lower end with a disk like bottom member 123. Concentrically of stem 120, a cylinder 220 is fastened to the disk 123, extending upwardly the whole height of the freezing can. Radially extending partition walls 320 are secured to the external surface of cylinder 220, and to the bottom disk 123.

The lower end of the stem 120 is in the form of a cylindrical plug 322, provided with a suitable annular gasket 222.

In operation, the said attachment is inserted into the freezing can 9 in lieu of the dasher unit 19, with its plug like end 322 closing the axial bore in the bottom of said can.

By this arrangement, water poured into the space between the freezing can and the cylinder 220, by putting the refrigerating mechanism into operation, will be converted into ice tiles, which may be extracted from the freezing can together with the attachment of FIGURE 4, in a like manner as described for the dasher.

It will be also noted that the attachment of FIGURE 4 is not provided with means for coupling it to the motor 3, since rotation of said attachment is not required.

Having thus fully described my invention, what I claim as new is:

1. In an ice cream freezer for the batchwise production of ice cream, a cabinet including a top wall, a cylindrical freezing can supported by said top wall, refrigerating means surrounding said can within said cabinet, said cylindrical freezing can being provided with a bottom wall having an axial through bore, removable dasher means inside said can, said dasher means comprising a bottom disk overlying said bottom wall of said can in close adjacency thereto and being of commensurate area with respect thereto so that an entire mass of ice cream formed within said can rests upon and is supported by said disk, a coaxial shaft extending upwardly from one side of said disk and a distance greater than the height of said can, scraping means secured to said shaft and disk, an axial hub extending from the opposite side of said disk through said bore in the can bottom outside of said freezing can, first coupling means on said hub end, an electric motor inside said cabinet; rotatably supported second coupling means below said bore in the can bottom for the disenengageable engagement with the first coupling means on said hub end whereby said dasher means may be removed bodily from said can together with the ice cream resting upon said disk, and transmission means from said motor shaft to said second coupling means for the operation of said dasher.

2. An ice cream freezer according to claim 1 in which said coupling means are in the form of male and female nest couplings.

3. In an ice cream freezer according to claim 1, the provision of water collecting means below said through bore in the freezing can bottom.

4. An ice cream freezer according to claim 3, in which said water-collecting means are in the form of a drawer, provided with a spout-like opening at its front end.

5. An ice cream freezer according to claim 3, in which said water-collecting means are in the form of a chamber disposed below the freezing can, and provided with a discharge port at its bottom.

6. An ice cream freezer according to claim 1, in which the said can bottom is in the form of a removable bottom.

7. The ice cream freezer according to claim 1, wherein said scraping means is in the form of a plurality of blades connected at their lower ends to said disk and extending upwardly therefrom in spaced relation to said coaxial shaft, said blades and said coaxial shaft presenting a lattice for retaining ice cream.

References Cited

UNITED STATES PATENTS

| | | | |
|---|---|---|---|
| 1,756,261 | 4/1930 | Pfouts | 62—343 |
| 3,029,613 | 4/1962 | Lande | 62—343 X |
| 3,138,008 | 6/1964 | Thompson | 62—290 |
| 2,577,916 | 12/1951 | Rollman | 62—298 X |

WILLIAM E. WAYNER, Primary Examiner

U.S. Cl. X.R.

62—298